Patented Aug. 5, 1947

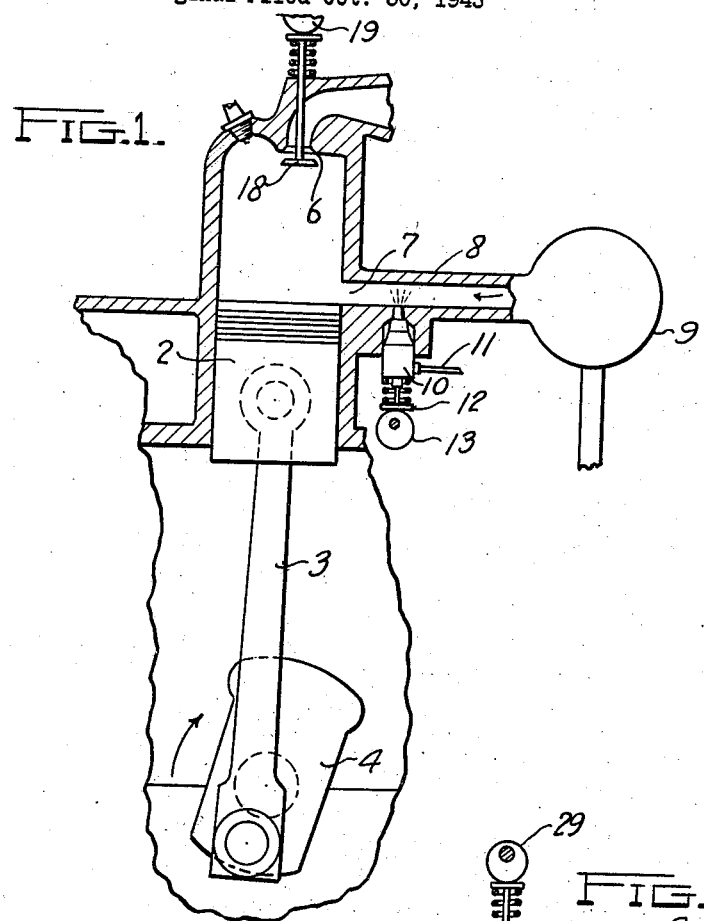
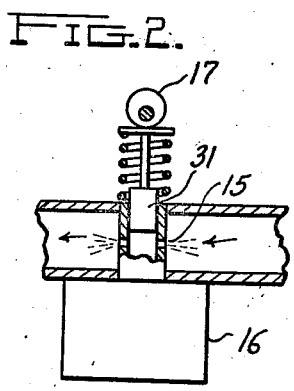
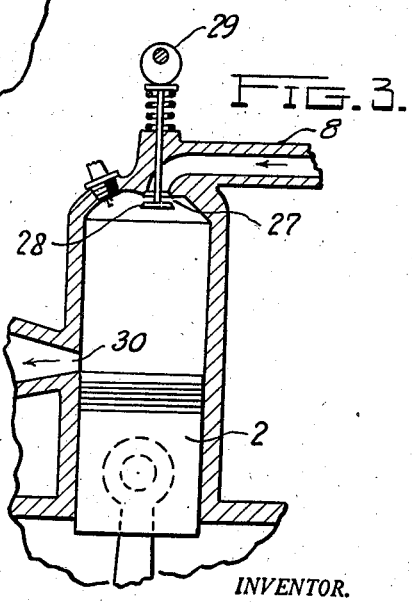

2,425,157

UNITED STATES PATENT OFFICE 2,425,157

TWO-CYCLE INTERNAL-COMBUSTION ENGINE

Marion Mallory, Detroit, Mich.

Original application October 30, 1943, Serial No. 508,299, now Patent No. 2,403,106, dated July 2, 1946. Divided and this application March 29, 1946, Serial No. 658,037

3 Claims. (Cl. 123—65)

This invention relates to a two-cycle internal combustion engine.

It is the object of this invention to produce a two-cycle internal combustion engine which operates more efficiently than those presently known. This object is achieved by timing the injection or admittance of fuel to take place slightly later than the opening of the intake and exhaust ports by the piston so that air will start to force out the exhaust gases before fuel is admitted to prevent the fuel from being admitted to the burning mixtures and also prevent fuel from escaping out of the exhaust.

Fig. 1 is a section through my two-cycle engine.

Fig. 2 is a detail view of the carburetor for supplying a carbureted charge to the engine.

Fig. 3 is a modified form of the invention.

Referring more particularly to the drawing the two-cycle engine comprises a cylinder 1, a reciprocating piston 2, connecting rod 3 and crankshaft 4.

The exhaust port is designated 6 and the intake port 7. The intake port 7 is connected by means of a pipe 8 with a source of air under pressure. If desired, this source of air under pressure can be an air compressor 9 shown diagrammatically. The fuel pipe 8 is provided with an injection nozzle 10 that can be connected to an injection pump where the fuel is forced in under pressure, or when a carbureted charge is used, the carburetor fuel nozzle 15 can be connected to a carburetor fuel bowl 16 and the nozzle can be controlled by a valve 31 which is opened and closed by a cam 17 so that the air compressor will blow the fuel in at the desired intervals (Fig. 2). The fuel nozzle is controlled by a valve 12 operated by a cam 13. Cam 13 is operated off of the engine and arranged to open the valve 12 to admit fuel into the fuel pipe and cylinder slightly after the piston 2 clears or opens the intake port 7. The injection preferably is completed and the valve 12 of the nozzle closed slightly before the piston 2 closes the intake port 7.

The exhaust port 6 is controlled by poppet valve 18 actuated by cam 19 so as to be open throughout the period that intake port 7 is open.

In the operation of the engine the source of air under pressure is at all times connected with intake port 7. As soon as the piston on the down stroke uncovers intake port 7, air under pressure is forced into the cylinder through port 7 and travels upwardly to assist in scavenging the exhaust gases out of the cylinder through exhaust port 6. As shown in Fig. 1, the piston has started on its upward stroke. Cam 13 is timed so that it opens nozzle 10 and permits fuel to be admitted into the fuel pipe and cylinder slightly later than the opening of the intake and exhaust ports. By thus slightly delaying the injection of the fuel into the cylinder, sufficient time is given to permit the exhaust flame to burn out or become extinguished and to permit the air under pressure to partly scavenge the exhaust gases from the cylinder before a fresh charge of raw fuel is injected into pipe 8 preparatory to flowing into the cylinder. This prevents any fuel from passing into the cylinder while the flame exists and from escaping out of the exhaust which increases the efficiency of the engine. The admittance of the fuel from nozzle 10 will be completed slightly before the intake port 7 is closed on the up stroke of the piston.

When a carbureted fuel charge is used then cam 17 will open fuel nozzle 15 in the same timed relation that cam 13 opens nozzle 10, that is, slightly later than the opening of the intake and exhaust ports.

The modified form shown in Fig. 3 differs from the above described form only in that intake port 27 is located in the cylinder head and is controlled by valve 28. Cam 29 is arranged to open valve 28 at the same time that piston 2 opens exhaust port 30 and valve 28 will remain open as long as exhaust port 30 is open. The timing of the fuel nozzle 10 or carburetor nozzle 15 is identically the same as above described; namely, fuel is admitted into fuel pipe 8 slightly later than the opening of the intake and exhaust ports so that sufficient time is given to permit the exhaust flame to burn out and to permit the air under pressure to partly scavenge the exhaust gases from the cylinder before a fresh charge of raw fuel is injected or drawn into pipe 8 preparatory to flowing into the cylinder through port 27. The admittance of fuel from either nozzle 10 or nozzle 15 will be completed slightly before intake port 27 and exhaust port 30 are closed on the up stroke of the piston.

This application is a division of my copending application Serial No. 508,299, filed October 30, 1943, now Patent 2,403,106, July 2, 1946.

I claim:

1. A two-cycle internal combustion engine comprising a cylinder, a reciprocating piston in said cylinder, intake and exhaust ports, one of which is controlled by said piston and the other port being located in the top of said cylinder, valve means for controlling said other port in the top of the cylinder so that said port opens and closes substantially simultaneously with the piston controlled port, a source of air under compression connected to said intake port whereby air under pressure flows into the cylinder through said intake port as soon as the intake port opens, and a fuel injector for injecting fuel into the stream of air under high pressure before it passes through the intake port, said injection occurring while the intake and exhaust ports are open and after the flame in the cylinder has died out.

2. A two-cycle internal combustion engine comprising a cylinder, a reciprocating piston in said cylinder, intake and exhaust ports, one of which is controlled by said piston and the other port being located in the top of said cylinder, valve means for controlling said other port in the top of the cylinder so that said port opens and closes substantially simultaneously with the piston controlled port, a fuel pipe connecting the intake port with a source of air under compression, an injection nozzle for injecting fuel into said fuel pipe preparatory to passing through said intake port, and means controlling said injection nozzle whereby the fuel is injected into the compressed air stream while the exhaust port is open and after compressed air free of fuel has been forced into the cylinder and the flame extinguished.

3. A two-cycle internal combustion engine comprising a cylinder, a reciprocating piston in said cylinder, intake and exhaust ports, one of which is controlled by said piston and the other port being located in the top of said cylinder, valve means for controlling said other port in the top of the cylinder so that said port opens and closes substantially simultaneously with the piston controlled port, a source of air under compression connected to said intake port whereby air under pressure flows into the cylinder as soon as the valve means uncovers the intake port, a nozzle from which fuel is drawn into the air stream by said air stream before it passes through the intake port and while the intake and exhaust ports are open and after the flame in the cylinder has died.

MARION MALLORY.

REFERENCES CITED

The following references are of record in the file of this patent:

UNITED STATES PATENTS

| Number | Name | Date |
| --- | --- | --- |
| 1,159,572 | D'Harveng | Nov. 9, 1915 |
| 967,073 | Smith | Aug. 9, 1910 |
| 2,403,106 | Mallory | July 2, 1946 |